United States Patent
Minami

(10) Patent No.: US 9,285,597 B2
(45) Date of Patent: *Mar. 15, 2016

(54) LIGHT SOURCE DEVICE AND STEREOSCOPIC DISPLAY

(71) Applicant: Sony Corporation, Tokyo (JP)

(72) Inventor: Masaru Minami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,613

(22) Filed: Feb. 11, 2014

(65) Prior Publication Data

US 2014/0160562 A1 Jun. 12, 2014

Related U.S. Application Data

(63) Continuation of application No. 13/235,647, filed on Sep. 19, 2011, now abandoned.

(30) Foreign Application Priority Data

Sep. 27, 2010 (JP) ................................. 2010-215533

(51) Int. Cl.
  *G02B 6/10* (2006.01)
  *G02B 27/22* (2006.01)
  *F21V 8/00* (2006.01)

(52) U.S. Cl.
  CPC ................ *G02B 27/22* (2013.01); *G02B 6/004* (2013.01); *G02B 6/0043* (2013.01); *G02B 6/0068* (2013.01); *G02B 27/2214* (2013.01)

(58) Field of Classification Search
  CPC .. G02B 6/0038; G02B 6/0036; G02B 6/0053; G02B 6/0046; G02B 27/0944; G02B 27/2264; G02B 1/133; G02B 6/004; G02B 6/0068

USPC ................... 359/464; 385/146; 362/625, 611
  See application file for complete search history.

(56) References Cited

U.S. PATENT DOCUMENTS 4,673,254 A  6/1987  Kato et al.
5,575,549 A  11/1996  Ishikawa et al.
(Continued)

FOREIGN PATENT DOCUMENTS

CN  1729702 A  2/2006
CN  1856720 A  11/2006
(Continued)

*Primary Examiner* — Audrey Y Chang
(74) *Attorney, Agent, or Firm* — Hazuki International, LLC

(57) ABSTRACT

A light source device includes: a light guide plate having first and second internal reflection planes facing each other; a first light source applying first illumination light from a side surface of the light guide plate into an interior thereof; a second light source facing the second internal reflection plane, and applying second illumination light to the second internal reflection plane; and a reflective member between the second internal reflection plane and the second light source. The second internal reflection plane is provided with a total-reflection region allowing the first illumination light to be reflected in a total-internal-reflection manner whereas allowing the second illumination light to pass therethrough, and a scattering region allowing the first illumination light to be reflected and scattered. The reflective member is disposed in a position corresponding to the scattering region, and reflects light having passed through the scattering region, toward the first internal reflection plane.

10 Claims, 12 Drawing Sheets

(56) References Cited

U.S. PATENT DOCUMENTS

| | | | |
|---|---|---|---|
| 5,831,765 A * | 11/1998 | Nakayama et al. | 359/464 |
| 5,897,184 A | 4/1999 | Eichenlaub et al. | |
| 5,956,107 A | 9/1999 | Hashimoto et al. | |
| 5,991,073 A | 11/1999 | Woodgate et al. | |
| 6,144,424 A | 11/2000 | Okuda et al. | |
| 6,447,132 B1 | 9/2002 | Harter, Jr. | |
| 7,356,211 B2 | 4/2008 | Sugiura et al. | |
| 7,507,011 B2 * | 3/2009 | Ueno et al. | 362/625 |
| 7,525,531 B2 | 4/2009 | Ogiwara et al. | |
| 7,876,397 B2 | 1/2011 | Krijn et al. | |
| 7,920,226 B2 | 4/2011 | Mather et al. | |
| 8,033,706 B1 | 10/2011 | Kelly et al. | |
| 8,820,997 B2 | 9/2014 | Minami | |
| 8,821,001 B2 | 9/2014 | Minami | |
| 8,876,349 B2 | 11/2014 | Minami | |
| 2006/0056791 A1 * | 3/2006 | Tzschoppe | 385/146 |
| 2006/0146573 A1 * | 7/2006 | Iwauchi et al. | 362/621 |
| 2007/0091638 A1 * | 4/2007 | Ijzerman et al. | 362/611 |
| 2010/0091354 A1 | 4/2010 | Nam et al. | |
| 2010/0110340 A1 | 5/2010 | Mather et al. | |
| 2010/0157200 A1 | 6/2010 | Mun et al. | |
| 2011/0205448 A1 | 8/2011 | Takata | |
| 2011/0242411 A1 | 10/2011 | Auer et al. | |
| 2011/0242441 A1 | 10/2011 | Minami | |
| 2011/0317261 A1 * | 12/2011 | Minami et al. | 359/462 |
| 2012/0014136 A1 | 1/2012 | Lee et al. | |
| 2012/0075698 A1 * | 3/2012 | Minami | 359/462 |
| 2012/0105767 A1 | 5/2012 | Choi et al. | |
| 2012/0195072 A1 * | 8/2012 | Minami | 362/613 |
| 2012/0256974 A1 | 10/2012 | Minami | |
| 2012/0257406 A1 * | 10/2012 | Minami | 362/602 |
| 2012/0275183 A1 * | 11/2012 | Minami | 362/602 |
| 2012/0306861 A1 * | 12/2012 | Minami | 345/419 |
| 2013/0076999 A1 | 3/2013 | Minami | |
| 2013/0083260 A1 | 4/2013 | Minami | |
| 2013/0105767 A1 | 5/2013 | Lin et al. | |
| 2013/0114292 A1 | 5/2013 | Brick et al. | |
| 2014/0111714 A1 | 4/2014 | Minami | |

FOREIGN PATENT DOCUMENTS

| | | |
|---|---|---|
| JP | 62-029003 A | 7/1987 |
| JP | 01-241590 A | 9/1989 |
| JP | 03-011502 A | 1/1991 |
| JP | 10-097199 A | 4/1998 |
| JP | 10-508151 A | 8/1998 |
| JP | 3565391 B2 | 6/2004 |
| JP | 2004-240294 A | 8/2004 |
| JP | 2004-279815 A | 10/2004 |
| JP | 2007-507071 A | 3/2007 |
| JP | 2007-187823 A | 7/2007 |
| JP | 2007-242336 A | 9/2007 |
| JP | 2007-272994 A | 10/2007 |
| JP | 2007-279224 A | 10/2007 |
| JP | 2009-176593 A | 8/2009 |
| WO | WO 2010/024647 A2 | 3/2010 |

* cited by examiner

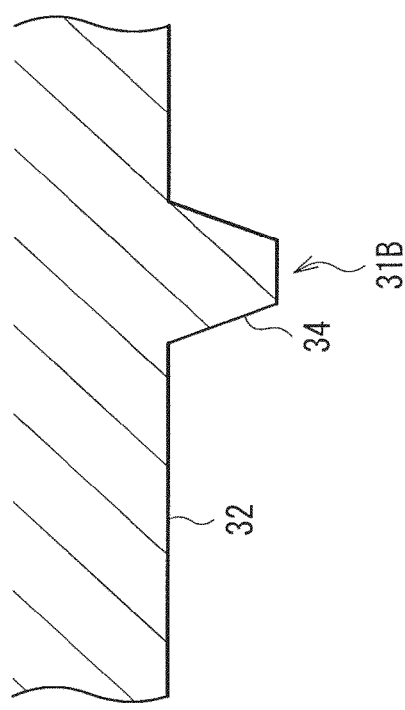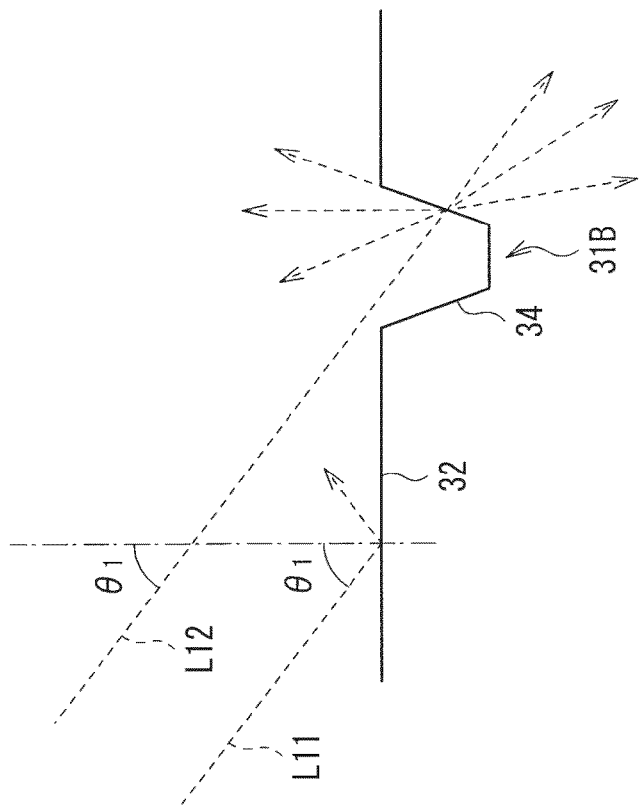
FIG. 5A
FIG. 5B

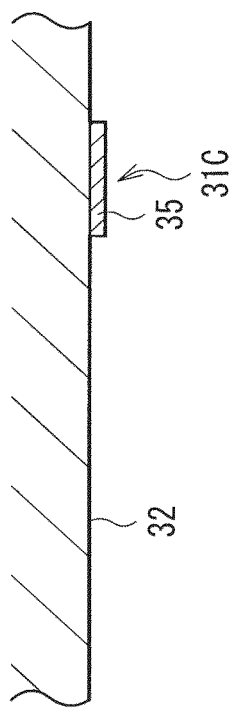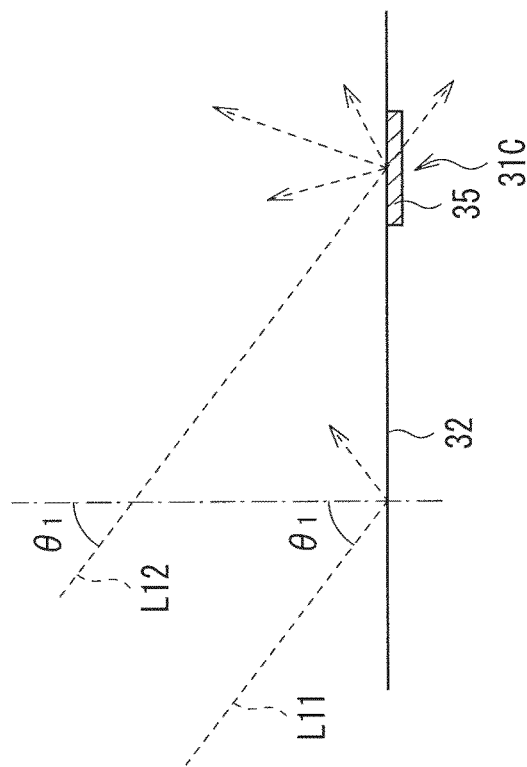
FIG. 6A
FIG. 6B

LIGHT SOURCE DEVICE AND STEREOSCOPIC DISPLAY

CROSS REFERENCES TO RELATED APPLICATIONS

This application claims the benefit under 35 U.S.C. §120 as a continuation of U.S. application Ser. No. 13/235,647, filed on Sep. 19, 2011, which claims priority to Japanese Patent Application No. 2010-215533, filed in the Japanese Patent Office on Sep. 27, 2010, the entire contents of each of which are incorporated herein by reference.

BACKGROUND

The present technology relates to a light source device and a stereoscopic display capable of achieving stereoscopic vision by a parallax barrier system.

In related art, as one of stereoscopic display systems which are allowed to achieve stereoscopic vision with naked eyes without wearing special glasses, a parallax barrier system stereoscopic display is known. FIG. 13 illustrates a typical configuration example of the parallax barrier system stereoscopic display. In the stereoscopic display, a parallax barrier 101 is disposed to face a front surface of a two-dimensional display panel 102. In a typical configuration of the parallax barrier 101, shielding sections 111 shielding display image light from the two-dimensional display panel 102 and stripe-shaped opening sections (slit sections) 112 allowing the display image light to pass therethrough are alternately arranged in a horizontal direction.

An image based on three-dimensional image data is displayed on the two-dimensional display panel 102. For example, a plurality of parallax images including different parallax information, respectively, are prepared as three-dimensional image data, and each of the parallax images are separated into, for example, a plurality of stripe-shaped separated images extending in a vertical direction. Then, the separated images of the plurality of parallax images are alternately arranged in a horizontal direction to produce a composite image including a plurality of stripe-shaped parallax images in one screen, and the composite image is displayed on the two-dimensional display panel 102. In the case of the parallax barrier system, the composite image displayed on the two-dimensional display panel 102 is viewed through the parallax barrier 101. When the widths of the separated images to be displayed, a slit width in the parallax barrier 101 and the like are appropriately set, in the case where a viewer watches the stereoscopic display from a predetermined position and a predetermined direction, light rays from different parallax images are allowed to enter into left and right eyes 10L and 10R of the viewer, respectively, through the slit sections 112. Thus, when the viewer watches the stereoscopic display from a predetermined position and a predetermined direction, a stereoscopic image is perceived. To achieve stereoscopic vision, it is necessary for the left and right eyes 10L and 10R to view different parallax images, respectively, so two or more parallax images, that is, an image for right eye and an image for left eye are necessary. In the case where three or more parallax images are used, multi-view vision is achievable. When more parallax images are used, stereoscopic vision in response to changes in viewing position of the viewer is achievable. In other words, motion parallax is obtained.

In the configuration example in FIG. 13, the parallax barrier 101 is disposed in front of the two-dimensional display panel 102. For example, in the case where a transparent liquid crystal display panel is used, the parallax barrier 101 may be disposed behind the two-dimensional display panel 101 (refer to FIG. 3 in Japanese Unexamined Patent Application Publication No. 2007-187823). In this case, when the parallax barrier 101 is disposed between the transparent liquid crystal display panel and a backlight, stereoscopic display is allowed to be performed based on the same principle as that in the configuration example in FIG. 13.

SUMMARY

In stereoscopic displays such as the above-described stereoscopic display, a display capable of switching from three-dimensional display to typical two-dimensional display as necessary to perform not only three-dimensional display but also two-dimensional display has been developed. For example, FIG. 3 in Japanese Unexamined Patent Application Publication No. 2007-187823 illustrates a configuration in which a first light source as a backlight and a first light guide plate, and a second light source and a second light guide plate are included and a parallax barrier is disposed between the first light guide plate and the second light guide plate. In the configuration described in Japanese Unexamined Patent Application Publication No. 2007-187823, the first light source and the first light guide plate are used to perform two-dimensional display, and the second light source, the second light guide plate and the parallax barrier are used to perform three-dimensional display. In other words, switching between two-dimensional display and three-dimensional display is performed by selectively switching from one of two light sources to another.

In the configuration described in Japanese Unexamined Patent Application Publication No. 2007-187823, a semi-transparent member is used for the first light guide plate to achieve switching between two-dimensional display and three-dimensional display. Therefore, for example, in the case where a reflective film including a semi-transparent member with a transmittance of 50% is used, light utilization rates of the first and second light guide plates are 50%, thereby reducing light use efficiency. Moreover, for example, in the case where small scattering particles as the semi-transparent member are included in the first light guide plate, light having directivity and having passed through the second light guide plate and a parallax barrier is scattered by the first light guide plate to cause some issues such as a deterioration in three-dimensional display quality.

It is desirable to provide a light source device and a stereoscopic display capable of preventing a decline in light use efficiency and performing switching between two-dimensional display and three-dimensional display without deteriorating display quality.

According to an embodiment of the technology, there is provided a light source device including: a light guide plate having a first internal reflection plane and a second internal reflection plane which face each other; a first light source applying first illumination light from a side surface of the light guide plate into an interior thereof; a second light source disposed to face the second internal reflection plane of the light guide plate, and applying second illumination light to the second internal reflection plane; and a reflective member disposed between the second internal reflection plane and the second light source, in which the second internal reflection plane is provided with a total-reflection region and a scattering region, the total-reflection region allowing the first illumination light to be reflected in a manner of total-internal-reflection whereas allowing the second illumination light to pass therethrough, and the scattering region allowing the first illumination light to be reflected and scattered, and the reflective member is disposed in a position corresponding to the scattering region, and reflects light having passed through the scattering region, toward the first internal reflection plane.

According to an embodiment of the technology, there is provided a stereoscopic display including: a display section displaying an image; and a light source device emitting light for image display toward the display section, in which the light source device is configured of the light source device according to the above-described embodiment of the technology.

In the light source device or the stereoscopic display according to the embodiment of the technology, the first illumination light from the first light source is totally reflected between the first internal reflection plane and the second internal reflection plane in an interior of the light guide plate. However, a part or all of the first illumination light scattered and reflected by the scattering region on the second internal reflection plane exits from the first internal reflection plane as light rays out of a total-reflection condition. In this case, even if light having passed through the scattering region is present, the reflective member is disposed in a position corresponding to the scattering region between the second internal reflection plane and the second light source; therefore, the light is reflected as a light ray out of the total-reflection condition toward the first internal reflection plane. Therefore, the first illumination light is allowed to be used efficiently. The second illumination light from the second light source passes through the total-reflection region on the second internal reflection plane to become a light ray out of the total-reflection condition on the first internal reflection plane, and exit from the first internal reflection plane of the light guide plate. Therefore, the light guide plate is allowed to have a function as a parallax barrier. In other words, the light guide plate is allowed to equivalently function as a parallax barrier with the scattering region as an opening section (a slit section) and the total-reflection region as a shielding section for the first illumination light from the first light source.

Therefore, when ON (light-on)/OFF (light-off) control of the first light source and the second light source is appropriately performed, illumination light for two-dimensional display and illumination light for three-dimensional display are obtainable. More specifically, in the case where three-dimensional display is performed, the first light source is in an ON (light-on) state, and the second light source is in an OFF (light-off) state. In this case, the first illumination light scattered and reflected by the scattering region of the second internal reflection plane of the light guide plate passes through the first internal reflection plane of the light guide plate to exit from the light guide plate. Moreover, in the case where two-dimensional display is performed, the first light source is in an ON (light-on) state or in an OFF (light-off) state, and the second light source is in an ON (light-on) state. In this case, when the second illumination light from the second light source passes through the total-reflection region of the second internal reflection plane, the second illumination light exit from substantially the entire first internal reflection plane of the light guide plate.

In the light source device or the stereoscopic display according to the embodiment of the technology, the scattering region and the total-reflection region are disposed in the second internal reflection plane of the light guide plate, and the first illumination light from the first light source and the second illumination light from the second light source are allowed to selectively exit from the light guide plate; therefore, the light guide plate is allowed to equivalently function as a parallax barrier. In particular, the reflective member is disposed in a position corresponding to the scattering region between the second internal reflection plane of the light guide plate and the second light source, and light having passed through the scattering region is reflected toward the first internal reflection plane. Therefore, while preventing a decline in light use efficiency, illumination light for two-dimensional display and illumination light for three-dimensional display are selectively obtainable. Therefore, while preventing a decline in light use efficiency, switching between two-dimensional display and three-dimensional display is allowed to be performed without deteriorating display quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 5A and 5B are a sectional view illustrating a second configuration example of the light guide plate surface in the stereoscopic display illustrated in FIG. 1, and a schematic explanatory diagram illustrating scattering/reflection states of light rays on the light guide plate surface illustrated in FIG. 5A, respectively.

FIGS. 6A and 6B are a sectional view illustrating a third configuration example of the light guide plate surface in the stereoscopic display illustrated in FIG. 1, and a schematic explanatory diagram illustrating scattering/reflection states of light rays on the light guide plate surface illustrated in FIG. 6A, respectively.

FIG. 8 is processed into a projected shape.

DETAILED DESCRIPTION OF THE PREFERRED EMBODIMENTS

Figure 1:
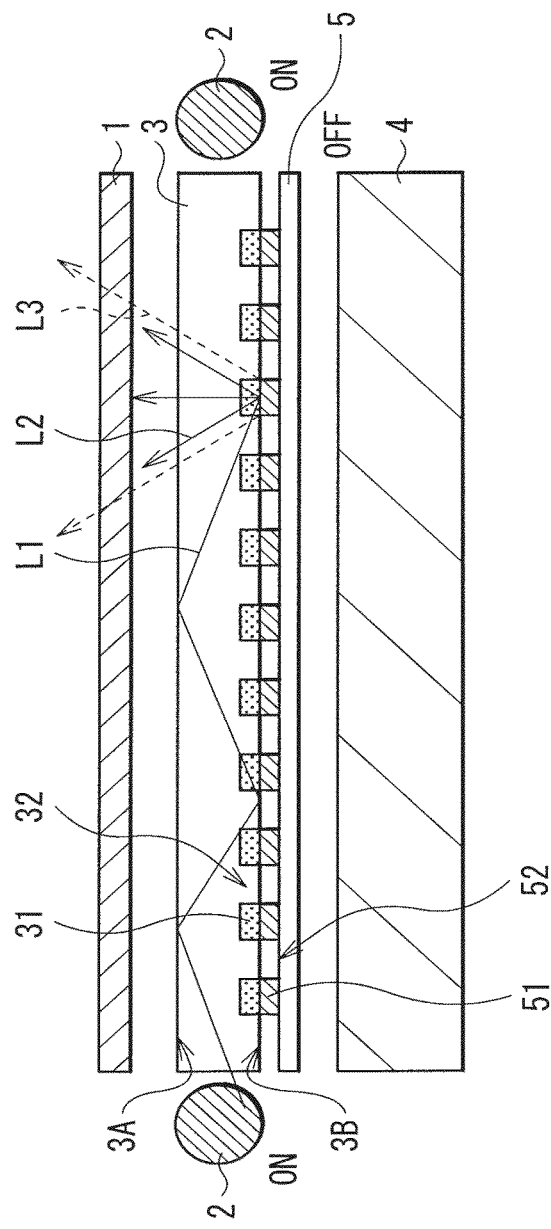
FIG. 1 is a sectional view illustrating a configuration example of a stereoscopic display according to a first embodiment of the technology with a state of emission of light rays from a light source device in the case where only a first light source is in an ON (light-on) state.
Figure 2:
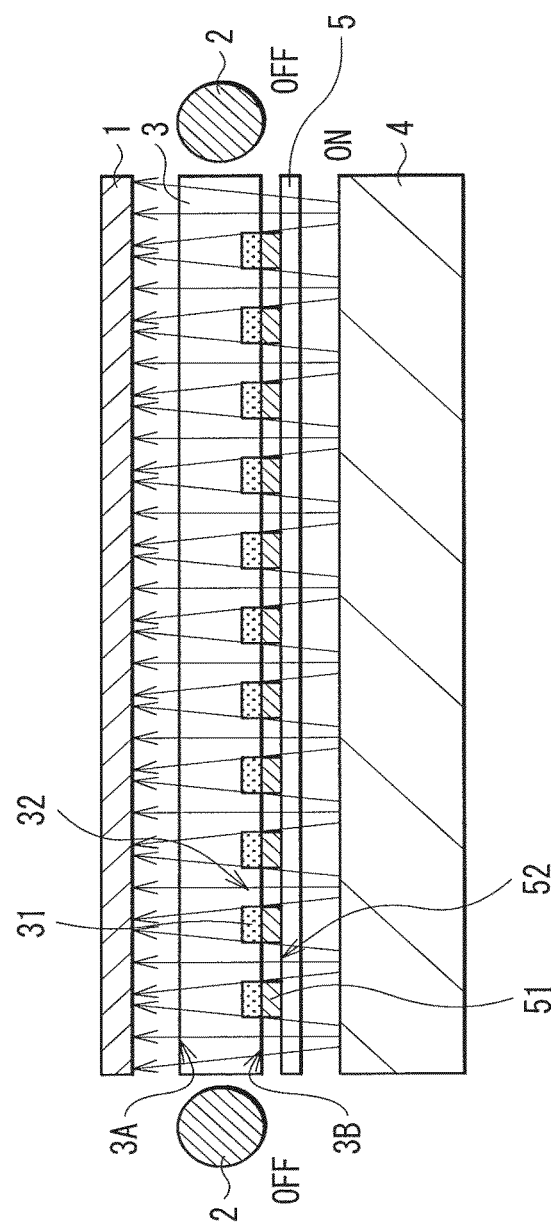
FIG. 2 is a sectional view illustrating a configuration example of the stereoscopic display illustrated in FIG. 1 with a state of emission of light rays from the light source device in the case where only a second light source is in an ON (light-on) state.
Figure 3:
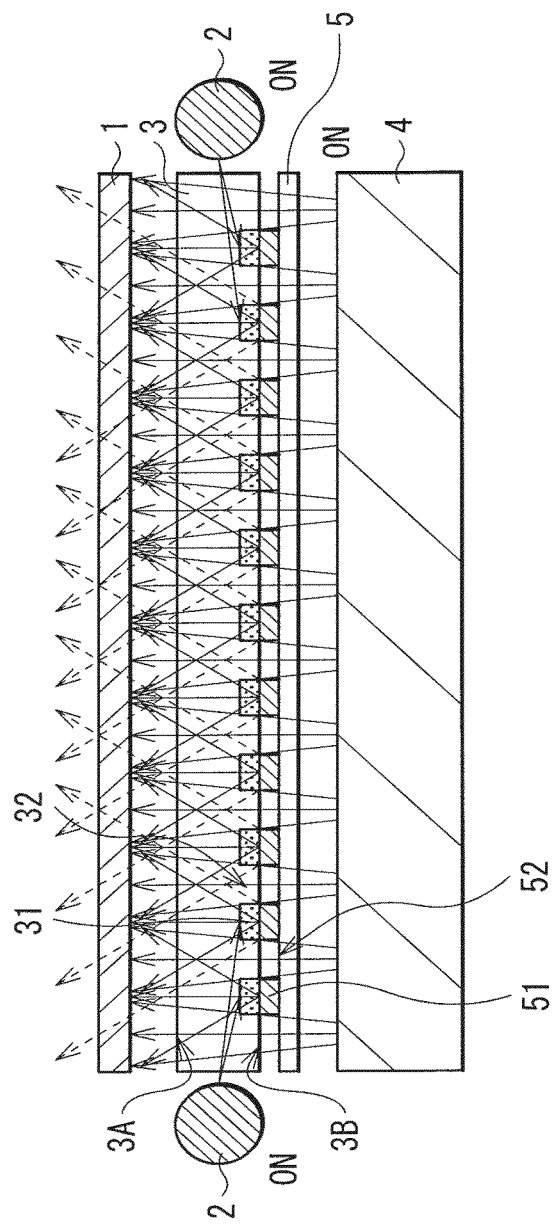
FIG. 3 is a sectional view illustrating a configuration example of the stereoscopic display illustrated in FIG. 1 with a state of emission of light rays from the light source device in the case where both of the first light source and the second light source are in an ON (light-on) state.

Preferred embodiments of the technology will be described in detail below referring to the accompanying drawing First Embodiment Whole Configuration of Stereoscopic Display FIGS. 1 to 3 illustrate a configuration example of a stereoscopic display according to a first embodiment of the technology. The stereoscopic display includes a display section 1 which displays an image and a light source device which is disposed on a back surface of the display section 1 and emits light for image display toward the display section 1. The light source device includes a first light source 2 (a 2D/3D-display light source), a light guide plate 3, a second light source 4 (2D-display light source) and a transparent substrate 5. The light guide plate 3 has a first internal reflection plane 3A facing the display section 1 and a second internal reflection plane 3B facing the second light source 4. It is to be noted that the stereoscopic display includes a control circuit for the display section 1 or the like which is necessary for display; however, the control circuit or the like has the same configuration as that of a typical control circuit for display or the like, and will not be described herein. Moreover, the light source device includes a control circuit (not illustrated) performing ON (light-on)/OFF (light-off) control of the first light source 2 and the second light source 4.

The stereoscopic display is allowed to selectively perform switching between a two-dimensional (2D) display mode on an entire screen and a three-dimensional (3D) display mode on the entire screen as necessary. Switching between the two-dimensional display mode and the three-dimensional display mode is allowed to be performed by switching control of image data to be displayed on the display section 1 and ON/OFF switching control of the first light source 2 and the second light source 4. FIG. 1 schematically illustrates a state of emission of light rays from the light source device in the case where only the first light source 2 is in an ON (light-on) state, and corresponds to the three-dimensional display mode. FIG. 2 schematically illustrates a state of emission of light rays from the light source device in the case where only the second light source 4 is in an ON (light-on) state, and corresponds to the two-dimensional display mode. Moreover, FIG. 3 schematically illustrates a state of emission of light rays from the light source device in the case where both of the first light source 2 and the second light source 4 are in an ON (light-on) state, and corresponds to the two-dimensional display mode.

Figure 13:
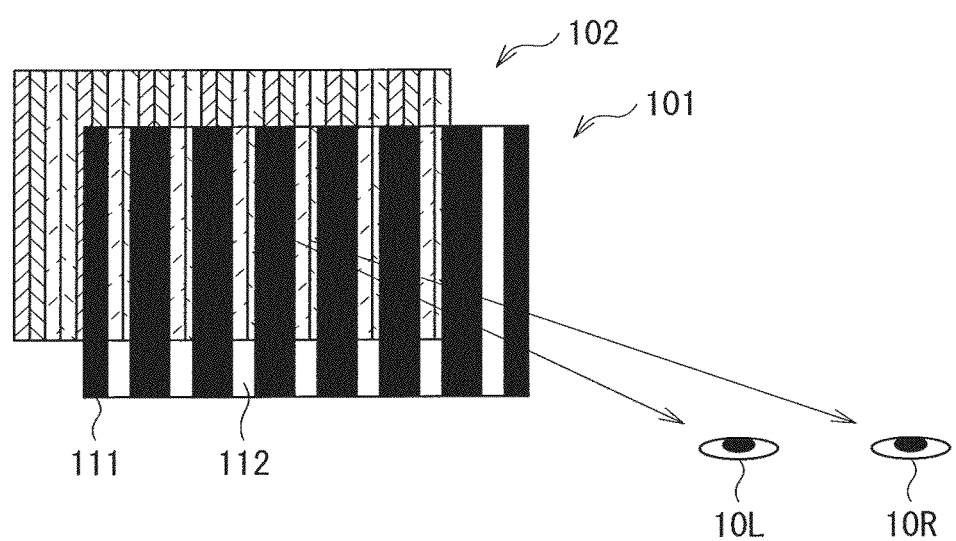
FIG. 13 is a configuration diagram illustrating a typical configuration example of a parallax barrier system stereoscopic display.

The display section 1 is configured with use of a transmissive two-dimensional display panel, for example, a transmissive liquid crystal display panel, and includes a plurality of pixels configured of, for example, R (red) pixels, G (green) pixels and B (blue) pixels, and the plurality of pixels are arranged in a matrix form. The display section 1 displays a two-dimensional image by modulating light from the light source device from one pixel to another based on image data. The display section 1 selectively displays one of an image based on three-dimensional image data and an image based on two-dimensional image data as necessary by switching. It is to be noted that the three-dimensional image data is, for example, data including a plurality of parallax images corresponding to a plurality of viewing angle directions in three-dimensional display. For example, in the case where binocular three-dimensional display is performed, the three-dimensional image data is data including parallax images for right-eye display and left-eye display. In the case where three-dimensional display mode display is performed, as in the case of a parallax barrier system stereoscopic display in related art illustrated in FIG. 13, for example, a composite image including a plurality of stripe-shaped parallax images in one screen is produced and displayed.

The first light source 2 is configured with use of, for example, a fluorescent lamp such as a CCFL (Cold Cathode Fluorescent Lamp), or an LED (Light Emitting Diode). The first light source 2 applies first illumination light L1 (refer to FIG. 1) from a side surface of the light guide plate 3 into an interior thereof. One or more first light sources 2 are disposed on a side surface of the light guide plate 3. For example, in the case where the light guide plate 3 has a rectangular planar shape, the light guide plate 3 has four side surfaces, and it is only necessary to arrange the first light source 2 on one or more of the four side surfaces. FIG. 1 illustrates a configuration example in which the first light source 2 is disposed on each of two side surfaces facing each other of the light guide plate 3. ON/OFF control of the first light source 2 is performed in response to switching between the two-dimensional display mode and the three-dimensional display mode. More specifically, in the case where the display section 1 displays an image based on the three-dimensional image data (in the case of the three-dimensional display mode), the first light source 2 is controlled to be in a light-on state, and in the case where the display section 1 displays an image based on the two-dimensional image data (in the case of the two-dimensional display mode), the first light source 2 is controlled to be in a light-off state or a light-on state.

The second light source 4 is disposed to face the second internal reflection plane 3B of the light guide plate 3. The second light source 4 externally applies second illumination light toward the second internal reflection plane 3B (refer to FIGS. 2 and 3). The second light source 4 may be a planar light source emitting light with uniform in-plane luminance, and the configuration thereof is not specifically limited, and the second light source 4 may be configured with use of a commercially available planar backlight. For example, a configuration using a light-emitting body such as a CCFL or an LED and a light-scattering plate for equalizing in-plane luminance, or the like is considered. ON (light-on)/OFF (light-off)

control of the second light source 4 is performed in response to switching between the two-dimensional display mode and the three-dimensional display mode. More specifically, in the case where the display section 1 displays an image based on the three-dimensional image data (in the case of the three-dimensional display mode), the second light source 4 is controlled to be in a light-off state, and in the case where the display section 1 displays an image based on the two-dimensional image data (in the case of the two-dimensional display mode), the second light source 4 is controlled to be in a light-on state.

The light guide plate 3 is configured of a transparent plastic plate of, for example, an acrylic resin. All surfaces except for the second internal reflection plane 3B of the light guide plate 3 are entirely transparent. For example, in the case where the light guide plate 3 has a rectangular planar shape, the first internal reflection plane 3A and four side surfaces are entirely transparent.

The entire first internal reflection plane 3A is mirror-finished, and allows light rays incident at an incident angle satisfying a total reflection condition to be reflected, in a manner of total-internal-reflection, in the interior of the light guide plate 3 and allows light rays out of the total-reflection condition to exit therefrom.

The second internal reflection plane 3B has a scattering region 31 and a total-reflection region 32. As will be described later, the scattering region 31 is formed by laser processing, sandblast processing or coating on a surface of the light guide plate 3 or bonding a sheet-like light-scattering member on the surface of the light guide plate 3. In the second internal reflection plane 3B, in the three-dimensional display mode, the scattering region 31 and the total-reflection region 32 function as an opening section (a slit section) and a shielding section of a parallax barrier for the first illumination light L1 from the first light source 2, respectively. In the second internal reflection plane 3B, the scattering region 31 and the total-reflection region 32 are arranged in a pattern forming a configuration corresponding to a parallax barrier. In other words, the total-reflection region 32 is arranged in a pattern corresponding to a shielding section in the parallax barrier, and the scattering region 31 is arranged in a pattern corresponding to an opening section in the parallax barrier. As a barrier pattern of the parallax barrier, for example, a stripe pattern in which a large number of vertically long slit-like opening sections are arranged in parallel with shielding sections in between is known. However, as the barrier pattern, any of various known barrier patterns in related art may be used, and the barrier pattern is not specifically limited.

The first internal reflection plane 3A and the total-reflection region 32 of the second internal reflection plane 3B reflect light rays incident at an incident angle $\theta 1$ satisfying a total reflection condition in a manner of total-internal-reflection (reflect light rays incident at the incident angle $\theta 1$ larger than a predetermined critical angle $\alpha$ in a manner of total-internal-reflection). Therefore, the first illumination light L1 incident from the first light source 2 at the incident angle $\theta 1$ satisfying the total reflection condition is guided to a side surface direction by internal total reflection between the first internal reflection plane 3A and the total-reflection region 32 of the second internal reflection plane 3B. Moreover, as illustrated in FIG. 2 or FIG. 3, the total-reflection region 32 allows the second illumination light from the second light source 4 to pass therethrough to emit the second illumination light as a light ray out of the total-reflection condition toward the first internal reflection plane 3A.

It is to be noted that the critical angle $\alpha$ is represented as follow, where the refractive index of the light guide plate 3 is n1, and the refractive index of a medium (an air layer) outside the light guide plate 3 is n0 (<n1). The angles $\alpha$ and $\theta 1$ are angles with respect to a normal to a surface of the light guide plate. The incident angle $\theta 1$ satisfying the total reflection condition is $\theta 1 > \alpha$.

$$\sin \alpha = n0/n1$$

As illustrated in FIG. 1, the scattering region 31 scatters and reflects the first illumination light L1 from the first light source 2 and emits partial light L2 of the first illumination light L1 toward the first internal reflection plane 3A as a light ray out of the total-reflection condition.

The transparent substrate 5 is disposed between the second internal reflection plane 3B and the second light source 4. The transparent substrate 5 is configured of, for example, a glass substrate, and a reflection region 51 is disposed on a surface thereof in a position corresponding to the scattering region 31 in the light guide plate 3. In the transparent substrate 5, a region except for the reflection region 51 is a transparent region 52. The size of the reflection region 51 is preferably equal to or slightly larger than that of the scattering region 31. The reflection region 51 is preferably in proximity to the scattering region 31 (is in full contact with the scattering region 31 or is disposed to face the scattering region 31 with a slight space in between). In the reflection region 51, a high-reflectivity reflective member is disposed by, for example, printing or evaporation. As the reflective member disposed on the reflection region 51, for example, a regular reflective material such as silver or an irregular reflective material such as barium sulfate may be used.

Figure 12:
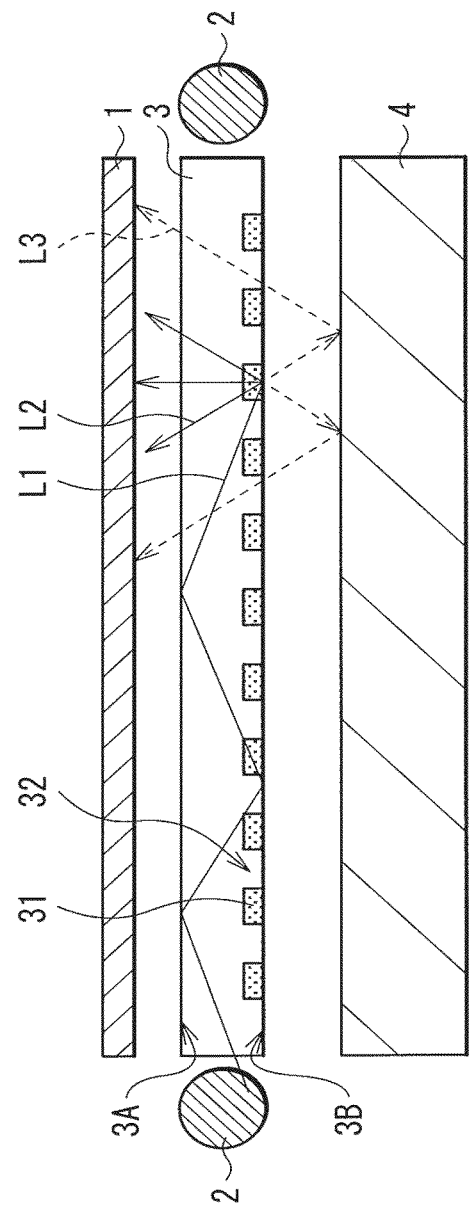
FIG. 12 is an explanatory diagram illustrating a configuration of a stereoscopic display of a comparative example relative to the stereoscopic display illustrated in FIG. 1.

In the case where the transparent substrate 5 (the reflection region 51) is not disposed as illustrated in a comparative example in FIG. 12, in the light guide plate 3, partial light of the first illumination light L1 becomes light L3 having passed through the scattering region 31. Therefore, light use efficiency is reduced, and the light L3 is reflected from a surface or the like of the second light source 4 to be returned to the light guide plate 3, thereby exiting from the light guide plate 3 as unintended emission light. In the case where three-dimensional display is performed, such unintended emission light causes the occurrence of so-called crosstalk in which the unintended emission light is perceived as a mixed image of a left-eye image and a right-eye image. On the other hand, as illustrated in FIG. 1, the reflection region 51 of the transparent substrate 5 reflects the light L3 having passed through the scattering region 31 toward the first internal reflection plane 3A. The reflection region 51 is disposed in a position corresponding to and in proximity to the scattering region 31 of the light guide plate 3; therefore, the light L3 having passed through the scattering region 31 is allowed to be reflected toward the first internal reflection plane 3A as light equivalent to the light L2 scattered and reflected by the scattering region 31, that is, effective light for three-dimensional display.

[Specific Configuration Example of Scattering Region 31]

Figure 4A:
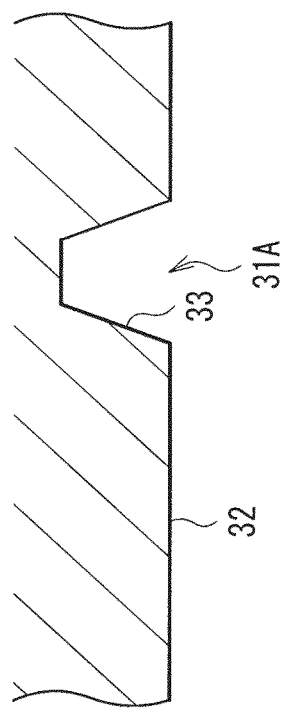
FIGS. 4A and 4B are a sectional view illustrating a first configuration example of a light guide plate surface in the stereoscopic display illustrated in FIG. 1, and a schematic explanatory diagram illustrating scattering/reflection states of light rays on the light guide plate surface illustrated in FIG. 4A, respectively.
Figure 4B:
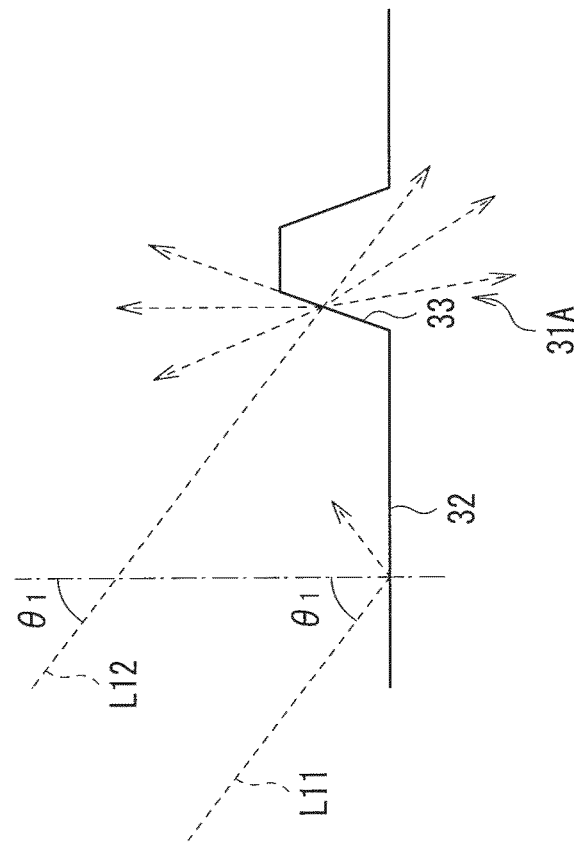

FIG. 4A illustrates a first configuration example of the second internal reflection plane 3B in the light guide plate 3. FIG. 4B schematically illustrates reflection and scattering states of light rays on the second internal reflection plane 3B in the first configuration example illustrated in FIG. 4A. In the first configuration example, the scattering region 31 is a recessed scattering region 31A with respect to the total-reflection region 32. Such a recessed scattering region 31A is allowed to be formed by, for example, sandblast processing or laser processing. For example, a surface of the light guide plate 3 is minor-finished, and then a portion corresponding to the scattering region 31A is subjected to laser processing to form the scattering region 31A. In the first configuration example, first illumination light L11 incident from the first light source 2 at the incident angle θ1 satisfying the total reflection condition is reflected in a manner of total-internal-reflection by the total-reflection region 32 of the second internal reflection plane 3B. On the other hand, even if light enters the recessed scattering region 31A at the same incident angle θ1 as in the case where light enters the total-reflection region 32, some light rays of first illumination light L12 having entered the recessed scattering region 31A do not satisfy the total reflection condition on a side surface portion 33 of a recessed shape, and are scattered and pass through the side surface portion 33, and other light rays are scattered and reflected. As illustrated in FIG. 1, some or all of light rays scattered and reflected are emitted as light rays L2 out of the total-reflection condition toward the first internal reflection plane 3A. Moreover, as illustrated in FIG. 1, light scattered and having passed through the side surface portion 33 is emitted as a light ray L3 out of the total-reflection condition toward the first internal reflection plane 3A by the reflection region 51 of the transparent substrate 5.

FIG. 5A illustrates a second configuration example of the second internal reflection plane 3B of the light guide plate 3. FIG. 5B schematically illustrates reflection and scattering states of light rays on the second internal reflection plane 3B in the second configuration example in FIG. 5A. In the second configuration example, the scattering region 31 is a projected scattering region 31B with respect to the total-reflection region 32. Such a projected scattering region 31B is allowed to be formed, for example, by molding a surface of the light guide plate 3 by a die. In this case, a portion corresponding to the total-reflection region 32 is minor-finished by a surface of the die. In the second configuration example, the first illumination light L11 incident from the first light source 2 at the incident angle θ1 satisfying the total reflection condition is reflected in a manner of total-internal-reflection by the total-reflection region 32 of the second internal reflection plane 3B. On the other hand, even if light enters the projected scattering region 31B at the same incident angle θ1 as in the case where light enters the total-reflection region 32, some light rays of the first illumination light L12 having entered the projected scattering region 31B do not satisfy the total reflection condition on a side surface portion 34 of a projected shape, and are scattered and pass through the side surface portion 34, and other light rays are scattered and reflected. As illustrated in FIG. 1, some or all light rays scattered and reflected are emitted as light rays L2 out of the total-reflection condition toward the first internal reflection plane 3A. Moreover, as illustrated in FIG. 1, light scattered and having passed through the side surface portion 34 is emitted as a light ray L3 out of the total-reflection condition toward to the first internal reflection plane 3A by the reflection region 51 of the transparent substrate 5.

FIG. 6A illustrates a third configuration example of the second internal reflection plane 3B of the light guide plate 3. FIG. 6B schematically illustrates the reflection and scattering states of light rays on the second internal reflection plane 3B in the third configuration example illustrated in FIG. 6A. In the configuration examples in FIGS. 4A and 5A, the surface of the light guide plate 3 is processed into a geometry different from that of the total-reflection region 32 to form the scattering region 31. On the other hand, in a scattering region 31C in the configuration example in FIG. 6A, instead of processing the surface of the light guide plate 3, a light-scattering member 35 made of a material different from that of the light guide plate 3 is disposed on a surface, corresponding to the second internal reflection plane 3B, of the light guide plate 3. In this case, a white paint (for example, barium sulfate) as the light-scattering member 35 is patterned on the surface of the light guide plate 3 by screen printing to form the scattering region 31C. In the third configuration example, the first illumination light L11 incident from the first light source 2 at the incident angle θ1 satisfying the total reflection condition is reflected by the total-reflection region 32 on the second internal reflection plane 3B in a manner of total-internal-reflection. On the other hand, even if light enters the scattering region 31C where the light-scattering member 35 is disposed at the same incident angle θ1 as in the case where light enters the total-reflection region 32, a part of the first illumination light L12 having entered the scattering region 31C is scattered and passes through the scattering region 31C by the light-scattering member 35, and the other is scattered and reflected. Some or all of light rays scattered and reflected are emitted as light rays out of the total-reflection condition toward the first internal reflection plane 3A. Moreover, as illustrated in FIG. 1, light scattered and having passed through the scattering region 31C is emitted as a light ray L3 out of the total-reflection condition toward the first internal reflection plane 3A by the reflection region 51 of the transparent substrate 5.

[Operation of Stereoscopic Display]

In the case where the stereoscopic display performs three-dimensional display mode display, the display section 1 displays an image based on the three-dimensional image data, and ON (light-on)/OFF (light-off) control of the first light source 2 and the second light source 4 is performed for three-dimensional display. More specifically, as illustrated in FIG. 1, the first light source 2 is controlled to be in an ON (light-on) state, and the second light source 4 is controlled to be in an OFF (light-off) state. In this state, the first illumination light L1 from the first light source 2 is reflected repeatedly in a manner of total-internal-reflection between the first internal reflection plane 3A and the total-reflection region 32 of the second internal reflection plane 3B in the light guide plate 3 to be guided and emitted from a side surface where the first light source 2 is disposed to the other side surface facing the side surface. On the other hand, a part of the first illumination light L1 from the first light source 2 is scattered and reflected from the scattering region 31 of the light guide plate 3 to pass through the first internal reflection plane 3A of the light guide plate 3 and exit from the light guide plate 3. Therefore, the light guide plate 3 is allowed to have a function as a parallax barrier. In other words, for the first illumination light L1 from the first light source 2, the light guide plate 3 is allowed to equivalently function as a parallax barrier with the scattering region 31 as an opening section (slit section) and the total-reflection region 51 as a shielding section. Therefore, three-dimensional display by a parallax barrier system in which the parallax barrier is equivalently disposed on a back surface of the display section 1 is performed. Moreover, in the embodiment, even if light L3 scattered and having passed through the scattering region 31 is present in the light guide plate 3, a reflective member (the reflection region 51 of the transparent substrate 5) is disposed in a position corresponding to the scattering region 31 between the second internal reflection plane 3B and the second light source 4; therefore, the light L3 having passed through the scattering region 31 is reflected toward the first internal reflection plane 3A as a light ray out of the total-reflection condition. Therefore, the first illumination light L1 is allowed to be used efficiently as effective light for three-dimensional display.

On the other hand, in the case where two-dimensional display mode display is performed, the display section 1 displays an image base on the two-dimensional image data, and ON (light-on)/OFF (light-off) control of the first light source 2 and the second light source 4 is performed for two-dimensional display. More specifically, for example, as illustrated in FIG. 2, the first light source 2 is controlled to be in an OFF (light-off) state, and the second light source 4 is controlled to be in an ON (light-on) state. In this case, second illumination light from the second light source 4 passes through the total-reflection region 32 of the second internal reflection plane 3B to exit as a light ray out of the total-reflection condition from substantially the entire first internal reflection plane 3A. In other words, the light guide plate 3 functions as a planar light source similar to a typical backlight. Therefore, two-dimensional display by a backlight system in which a typical backlight is equivalently disposed on a back surface of the display section 1 is performed.

When only the second light source 4 is turned on, the second illumination light is emitted from substantially the entire surface of the light guide plate 3, and if necessary, the first light source 2 may be turned on as illustrated in FIG. 3. Therefore, for example, in the case where there is a difference in a luminance distribution between portions corresponding to the scattering region 31 and the total-reflection region 32 in a state where only the second light source 4 emits light, the lighting state of the first light source 2 is appropriately adjusted (ON/OFF control or the lighting amount of the first light source 2 is adjusted), thereby allowing the luminance distribution in an entire surface to be optimized. However, for example, in the case where luminance is sufficiently corrected in the display section 1 in two-dimensional display, it is only necessary for only the second light source 4 to be turned on.

Figure 7:
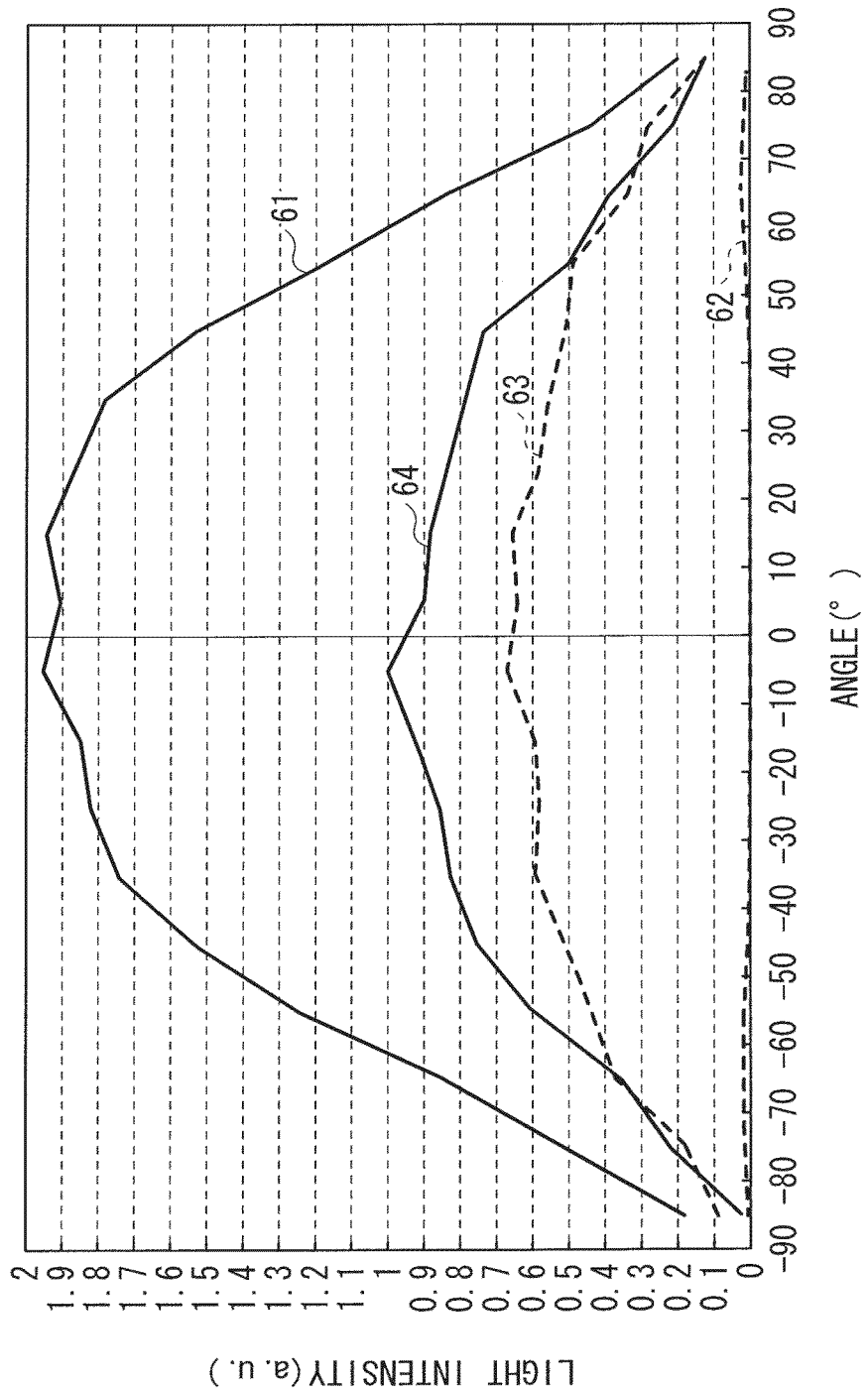
FIG. 7 is a plot illustrating an example of an intensity distribution of light observed on a display section side and a second light source side in the case where only the first light source in the light source device illustrated in FIG. 1 is in an ON (light-on) state.

FIG. 7 illustrates a simulation result of a light intensity distribution (orientation angle characteristics) in the case where the light source device of the stereoscopic display illustrated in FIG. 1 is in a state corresponding to the three-dimensional display (a state where the first light source 2 is in an ON (light-on) state and the second light source 4 is in an OFF (light-off) state). In FIG. 7, as a comparative example, a simulation result of a light intensity distribution in a configuration in which a reflective member (the transparent substrate 5) is not disposed between the second internal reflection plane 3B and the second light source 4 (refer to FIG. 12) is illustrated. In FIG. 7, a horizontal axis indicates angle (where a direction orthogonal to a light emission surface is 0°) and a vertical axis indicates standardized light intensity (arbitrary unit (a.u.)). As a simulation condition, the size of a pattern of the scattering region 31 in the light guide plate 3 and the size of a pattern of the reflection region 51 in the transparent substrate 5 are equal to each other. Moreover, the reflection region 51 is disposed directly below the scattering region 31 (the scattering region 31 and the reflection region 51 are not in contact with each other). A regular reflective material with a reflectivity of 90% is used for the reflection region 51. The light intensity on the vertical axis is standardized with reference to a maximum light amount of light emitted from the light guide plate 3 to the display section 1 in a state where a reflective member (the transparent substrate 5) is not disposed.

In FIG. 7, a curve with a reference numeral 61 indicates the intensity of light emitted to the display section 1 in the configuration illustrated in FIG. 1, and a curve with a reference numeral 62 indicates the intensity of light emitted to the second light source 4 in the configuration illustrated in FIG. 1. A curve with a reference numeral 64 indicates the intensity of light emitted to the display section 1 in a configuration of the comparative example illustrated in FIG. 12, and a curve with a reference numeral 63 indicates the intensity of light emitted to the second light source 4 in the configuration of the comparative example illustrated in FIG. 12. As is evident from the curve 61 and the curve 64, in the light source device according to the embodiment, a light amount equal to approximately twice the light amount obtained by the light source device of the comparative example is obtained on the display section 1 side. Moreover, as is evident from the curve 62 and the curve 63, in the light source device of the comparative example, a large amount of light is emitted to the second light source 4; however, in the light source device according to the embodiment, light is hardly emitted to the second light source 4. In other words, it is obvious that light use efficiency is high.

As described above, in the stereoscopic display using the light source device according to the embodiment, the scattering region 31 and the total-reflection region 32 are disposed in the second internal reflection plane 3B of the light guide plate 3, and the first illumination light from the first light source 2 and the second illumination light from the second light source 4 are allowed to selectively exit from the light guide plate 3; therefore, the light guide plate 3 is allowed to equivalently function as a parallax barrier. In particular, a reflective member (the reflection region 51 of the transparent substrate 5) is disposed in a position corresponding to the scattering region 31 between the second internal reflection plane 3B of the light guide plate 3 and the second light source 4 to reflect light having passed through the scattering region 31 to the first internal reflection plane 3A; therefore, while preventing a decline in light use efficiency, illumination light for two-dimensional display and illumination light for three-dimensional display are allowed to be selectively obtained. Therefore, while preventing a decline in light use efficiency, switching between two-dimensional display and three-dimensional display is allowed to be performed without deteriorating display quality. Moreover, the reflection region 51 is disposed in a position corresponding to and in proximity to the scattering region 31 of the light guide plate 3; therefore, light L3 having passed through the scattering region 31 is allowed to be reflected toward the first internal reflection plane 3A as light equivalent to light L2 scattered and reflected by the scattering region 31, that is, effective light for three-dimensional display. Therefore, the light L3 having passed through the scattering region 31 is allowed to be prevented from being emitted to an unintended direction, and the occurrence of crosstalk is preventable accordingly.

Second Embodiment

Next, a stereoscopic display according to a second embodiment of the technology will be described below. It is to be noted that like components are denoted by like numerals as of the stereoscopic display according to the first embodiment and will not be further described.

Figure 8:
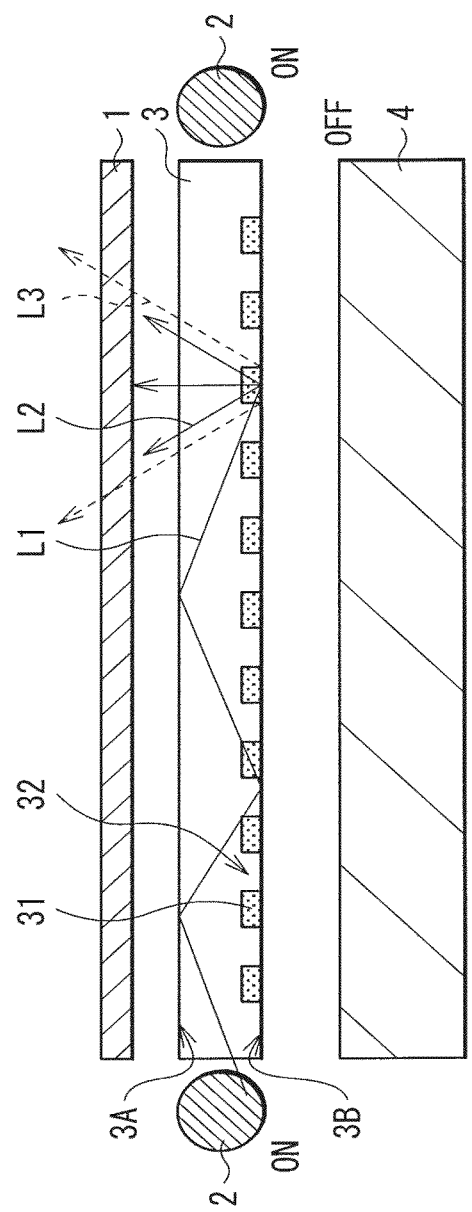
FIG. 8 is a sectional view illustrating a configuration example of a stereoscopic display according to a second embodiment of the technology with a state of emission of light rays from a light source device in the case where only a first light source is in an ON (light-on) state.

FIG. 8 illustrates a configuration example of the stereoscopic display according to the second embodiment of the technology. The stereoscopic display according to the embodiment has the same configuration as that of the stereoscopic display in FIG. 1, except that the transparent substrate 5 in the light source device is not included. Instead of the transparent substrate 5, a reflective member is disposed in a position corresponding to the scattering region 31 in the second internal reflection plane 3B of the light guide plate 3.

Figure 9A:
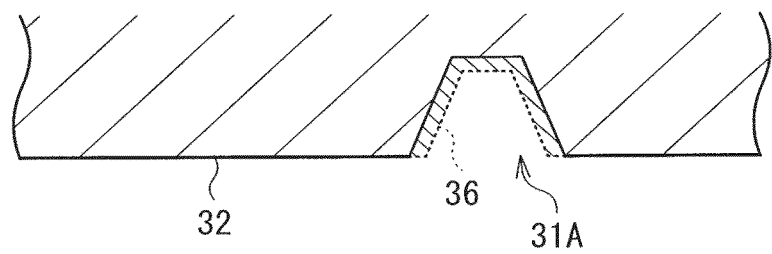
FIGS. 9A and 9B are a sectional view illustrating a first configuration example in the case where a light guide plate surface in the stereoscopic display illustrated in FIG. 8 is processed into a recessed shape, and an explanatory diagram illustrating a second configuration example in the case where the light guide plate surface is processed into a recessed shape.
Figure 9B:
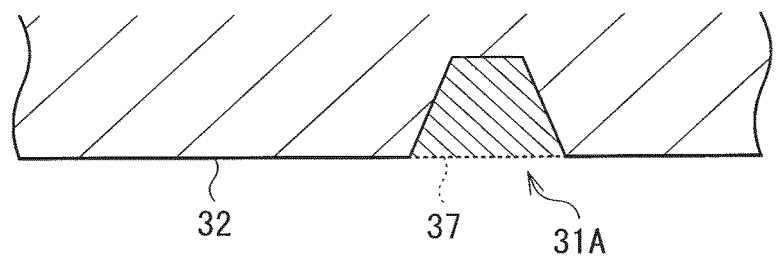

FIGS. 9A and 9B illustrate a configuration example in which in the case where the second internal reflection plane 3B of the light guide plate 3 has the recessed scattering region 31A as in the case of the configuration example in FIGS. 4A and 4B, a reflective member is disposed on the recessed scattering region 31A. In the configuration example in FIG. 9A, as the reflective member, a reflective film 36 made of a high-reflectivity material is formed on a surface of the recessed scattering region 31A by, for example, evaporation. In the configuration example in FIG. 9B, a high-reflectivity material 37 as a reflective member is filled in the recessed scattering region 31A by, for example, screen printing, thereby allowing an entire surface of the recessed scattering region 31A to be covered therewith.

Figure 10:
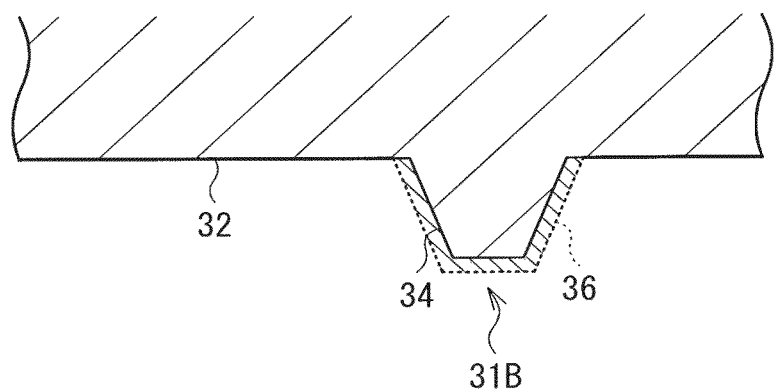
FIG. 10 is a sectional view illustrating a configuration example in the case where the light guide plate surface in the stereoscopic display illustrated

FIG. 10 illustrates a configuration example in which in the case where the second internal reflection plane 3B of the light guide plate 3 has the projected scattering region 31B as in the case of the configuration example in FIGS. 5A and 5B, a reflective member is disposed on the projected scattering region 31B. In this configuration example, as the reflective member, a reflective film 36 made of a high-reflectivity material is formed on a surface of the projected scattering region 31B by, for example, evaporation.

Figure 11A:
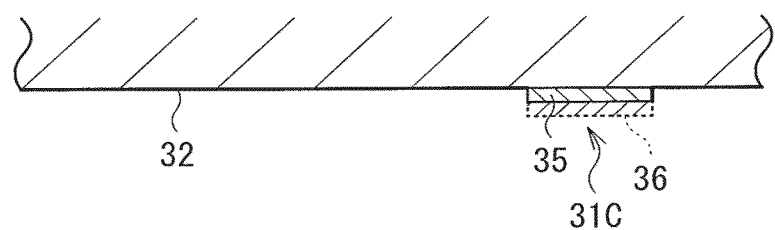
FIGS. 11A and 11B are a sectional view illustrating a first configuration example in the case where a different member is disposed on the light guide plate surface in the stereoscopic display illustrated in FIG. 8 and an explanatory diagram illustrating a second configuration example in the case where a different member is disposed on the light guide plate surface.
Figure 11B:
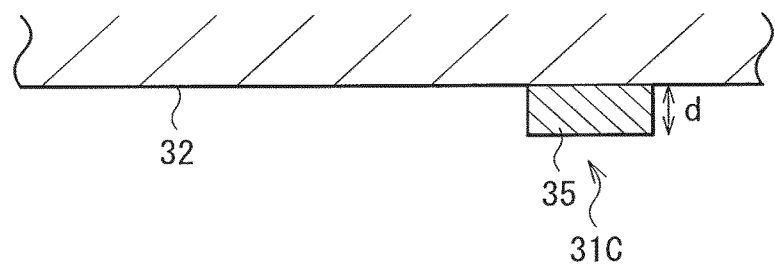

FIG. 11A illustrates a configuration example in which in the case where the light-scattering member 35 made of a different material from the material of the light guide plate 3 is disposed on a surface of the second internal reflection plane 3B of the light guide plate 3 as in the case of the configuration example in FIGS. 6A and 6B, a reflective member is disposed on the light-scattering member 35. In this configuration example, as the reflective member, a reflective film 36 made of a high-reflectivity material is formed on a surface of the light-scattering member 35 by, for example, screen printing. Moreover, in a configuration example in FIG. 11B, a thickness d of the light-scattering member 35 is increased to allow the light-scattering member 35 to have a function as a reflective member. As long as the reflectivity of the light-scattering member 35 is high, a configuration illustrated in FIG. 11B may be applicable.

In the stereoscopic display using the light source device according to the embodiment, a reflective member is directly disposed in a position corresponding to the scattering region 31 of the second internal reflection plane 3B of the light guide plate 3 without arranging the transparent substrate 5 between the second internal reflection plane 3B and the second light source 4; therefore, the number of components is reduced, compared to the stereoscopic display in FIG. 1, and space saving is achievable.

The present application contains subject matter related to that disclosed in Japanese Priority Patent Application 2010-215533 filed in the Japan Patent Office on Sep. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic display comprising:
a display section displaying an image;
a light source device emitting light for image display to the display section, wherein
the light source device includes
a light guide plate having a first internal reflection plane and a second internal reflection plane which face each other,
a first light source applying first illumination light from a side surface of the light guide plate into an interior thereof,
a second light source disposed to face the second internal reflection plane of the light guide plate, and applying second illumination light,
a plurality of total-reflection regions provided in the second internal reflection plane, the plurality of total reflection regions allowing the first illumination light to be reflected in a manner of total internal-reflection whereas allowing the second illumination light to pass therethrough,
a plurality of scattering regions provided in the second internal reflection plane, and allowing the first illumination light to be scattered, and
a reflective member disposed in a position corresponding to each of the plurality of scattering regions between the second internal reflection plane and the second light source, and reflecting the first illumination light having passed through a scattering region of the plurality of scattering regions, toward the first internal reflection plane, and
wherein the display section selectively displays one of an image based on three-dimensional image data and an image based on two-dimensional image data by switching; and
a control circuit configured to:
control the first light source to be in a light-on state in the case where an image based on three-dimensional image data is displayed on the display section, and to be in a light-off state or in a light-on state in the case where an image based on two-dimensional image data is displayed on the display section, and
control the second light source to be in a light-off state in the case where the image based on the three-dimensional image data is displayed on the display section, and to be in a light-on state in the case where the image based on the two-dimensional image data is displayed on the display section.

2. The stereoscopic display according to claim 1, wherein the light guide plate is configured to allow a light ray out of a total-reflection condition to exit from the first internal reflection plane, and the plurality of scattering regions and the corresponding reflective members allow the first illumination light to emit, as the light ray out of the total-reflection condition, toward the first internal reflection plane.

3. The stereoscopic display according to claim 2, wherein the plurality of total-reflection regions allow the second illumination light, being externally applied toward the second internal reflection plane, to pass therethrough and to emit, as the light ray out of the total-reflection condition, toward the first internal reflection plane.

4. The stereoscopic display according to claim 1, further comprising: a transparent substrate disposed between the second internal reflection plane and the second light source, wherein the reflective member is disposed, on the transparent substrate, in a position corresponding to each of the plurality of scattering regions.

5. The stereoscopic display according to claim 1, wherein the plurality of scattering regions are formed by processing a surface of the light guide plate into a geometry different from that of the plurality of total-reflection regions, the surface corresponding to the second internal reflection plane.

6. The stereoscopic display according to claim 5, wherein the reflective member corresponding to each of the plurality of scattering regions are provided in a surface processed into a geometry different from that of the plurality of total-reflection regions.

7. The stereoscopic display according to claim 1, wherein each of the plurality of scattering regions are formed by disposing, on a surface of the light guide plate, a light-scattering member made of a material different from that of the light guide plate, the surface corresponding to the second internal reflection plane of the light guide plate.

8. The stereoscopic display according to claim 7, wherein the reflective member is disposed on a topside of the light-scattering member.

9. The stereoscopic display according to claim 1, wherein allowing the first illumination light to be reflected comprises allowing the first illumination light to be reflected by the reflective member.

10. The stereoscopic display according to claim 1, wherein the control circuit is further configured to control the display section to selectively display the one of the image based on the three-dimensional image data and the image based on two-dimensional image data by switching.

* * * * *